United States Patent
Park et al.

(10) Patent No.: US 11,063,261 B2
(45) Date of Patent: Jul. 13, 2021

(54) ELECTRODE FOR ELECTROCHEMICAL DEVICE, METHOD FOR MANUFACTURING THE SAME, AND ELECTROCHEMICAL DEVICE INCLUDING THE SAME

(71) Applicants: UNIST(ULSAN NATIONAL INSTITUTE OF SCIENCE AND TECHNOLOGY), Ulsan (KR); POSTECH ACADEMY-INDUSTRY FOUNDATION, Pohang (KR)

(72) Inventors: Soo Jin Park, Ulsan (KR); Woo Jin Song, Ulsan (KR); So Hyeon Bae, Ulsan (KR); Un Yong Jeong, Pohang (KR); Jun Hyuk Song, Seoul (KR)

(73) Assignees: UNIST(ULSAN NATIONAL INSTITUTE OF SCIENCE AND TECHNOLOGY), Ulsan (KR); POSTECH ACADEMY-INDUSTRY FOUNDATION, Pohang-si (KR)

(*) Notice: Subject to any disclaimer, the term of this patent is extended or adjusted under 35 U.S.C. 154(b) by 92 days.

(21) Appl. No.: 16/385,137

(22) Filed: Apr. 16, 2019

(65) Prior Publication Data
US 2019/0252686 A1 Aug. 15, 2019

Related U.S. Application Data

(63) Continuation of application No. 15/477,178, filed on Apr. 3, 2017, now abandoned.

(30) Foreign Application Priority Data

Apr. 7, 2016 (KR) ........................ 10-2016-0042880

(51) Int. Cl.
*H01M 4/62* (2006.01)
*H01M 4/13* (2010.01)
(Continued)

(52) U.S. Cl.
CPC ............ *H01M 4/626* (2013.01); *H01G 11/26* (2013.01); *H01G 11/28* (2013.01); *H01G 11/68* (2013.01); *H01G 11/70* (2013.01); *H01G 11/86* (2013.01); *H01M 4/13* (2013.01); *H01M 4/139* (2013.01); *H01M 4/622* (2013.01); *H01M 4/485* (2013.01); *H01M 4/5825* (2013.01); *H01M 10/052* (2013.01); *H01M 10/054* (2013.01); *H01M 2004/021* (2013.01)

(58) Field of Classification Search
CPC .... H01M 4/626; H01M 4/139; H01M 4/0404; H01M 2004/021; H01M 4/622; H01G 11/28
See application file for complete search history.

(56) References Cited

U.S. PATENT DOCUMENTS 6,664,006 B1* 12/2003 Munshi ................... H01M 4/13
429/623.1
8,808,921 B2* 8/2014 Park ...................... H01M 4/667
429/234

OTHER PUBLICATIONS

Moon et al., Highly Stretchable Patterned Gold Electrodes Made of Au Nanosheets, Adv. Mater. 2013, 25, 2707-2712 (Year: 2013).*
(Continued)

*Primary Examiner* — Stephan J Essex
(74) *Attorney, Agent, or Firm* — Lex IP Meister, PLLC

(57) ABSTRACT

Provided are an electrode capable of maintaining electrical conductivity during elongation and shrinkage, a method for manufacturing the same, and electrochemical device including the same.

6 Claims, 14 Drawing Sheets

(51) Int. Cl.
  *H01M 4/139*   (2010.01)
  *H01G 11/26*   (2013.01)
  *H01G 11/28*   (2013.01)
  *H01G 11/68*   (2013.01)
  *H01G 11/70*   (2013.01)
  *H01G 11/86*   (2013.01)
  *H01M 10/052*   (2010.01)
  *H01M 10/054*   (2010.01)
  *H01M 4/02*   (2006.01)
  *H01M 4/485*   (2010.01)
  *H01M 4/58*   (2010.01)

(56) References Cited

OTHER PUBLICATIONS

Hong et al., Synthesis, properties and applications of one- and two-dimensional gold nanostructures, Nano Research 2015, 8(1): 40-55 (Year: 2015).*

* cited by examiner

<$Li_4Ti_5O_{12}$ Pouch half-cell>

<LiFePO₄ Pouch half-cell>

ELECTRODE FOR ELECTROCHEMICAL DEVICE, METHOD FOR MANUFACTURING THE SAME, AND ELECTROCHEMICAL DEVICE INCLUDING THE SAME

CROSS-REFERENCE TO RELATED APPLICATION

This application is a Divisional Application of U.S. patent application Ser. No. 15/477,178, which was filed on Apr. 3, 2017, which claims priority to and the benefit of Korean Patent Application No. 10-2016-0042880 filed in the Korean Intellectual Property Office on Apr. 7, 2016, the entire contents of which are incorporated herein by reference.

BACKGROUND OF THE INVENTION

(a) Field of the Invention

An electrode for an electrochemical device, a method for manufacturing the same, and an electrochemical device including the same are disclosed.

(b) Description of the Related Art

Recently, a wearable apparatus, a flexible apparatus, and the like have gained popularity.

Devices applied to these apparatuses secure safety and electrochemical performance as well as flexibility of each constituent element.

However, a generally-known manufacturing method has a limit in accomplishing flexibility of each constituent element. Particularly, an electrode may be manufactured to have flexibility but not secure safety and electrochemical performance.

SUMMARY OF THE INVENTION

Embodiments of the present invention are to provide an electrode maintaining electrical conductivity during elongation and shrinkage processes in order to solve the aforementioned problems, a method for manufacturing the same, and an electrochemical device including the same.

Electrode for Electrochemical Device

In an embodiment of the present invention, an electrode for an electrochemical device includes a composite film including an elastic polymer matrix and a first conductive material embedded in the elastic polymer matrix; a conductive film disposed on the composite film and including a second conductive material; and an electrode active material layer disposed on the conductive film, wherein each of the first conductive material and the second conductive material are a gold nanosheet.

The electrode 1) realizes excellent strength along with flexibility capable of elongation and shrinkage based on the elastic polymer matrix and 2) maintains electrical conductivity before and after the elongation and the shrinkage without a binder due to a conductive material with a nano unit inside and outside the elastic polymer matrix. Accordingly, a battery manufactured by applying the electrode may exhibit excellent flexibility, safety, electrochemical performance, and the like.

For a reference, both the first conductive material and the second conductive material have a gold nanosheet having a diameter of about 10 μm to about 20 μm and a thickness of about 2 nm to about 5 nm and are classified into first and second for convenience depending on a position.

Composite Film

Specifically, the gold nanosheet present inside the elastic polymer matrix is embedded among neighboring polymers and forms a composite film. On the other hand, the gold nanosheet present outside of the elastic polymer matrix is inserted in a form of a film between the elastic polymer matrix and the electrode active material layer.

Accordingly, the gold nanosheets may uniformly form a conductive percolation network with high density inside and outside the elastic polymer matrix and maintain the network during the elongation and the shrinkage.

More specifically, a weight ratio of the first conductive material/the polymer matrix in the composite film may range from about 10/100 to about 20/100. When the weight ratio is within the range, electrical conductivity and flexibility may be simultaneously pursued, but when first conductive material is excessively included beyond the range, the flexibility may be relatively deteriorated, and when the polymer matrix is excessively included beyond the range, the electrical conductivity may be relatively deteriorated.

On the other hand, the elastic polymer matrix may include one of block copolymers represented by Chemical Formulae 1 to 4. This block copolymer may exhibit excellent strength due to an excellent bond with a neighboring gold nanosheet (i.e., a first conductive material) as well as have flexibility capable of elongation and shrinkage. Accordingly, the electrode may maintain a stable structure during the elongation or the shrinkage.

A-block-B                                          [Chemical Formula 1]

A-block-B-block-C                     [Chemical Formula 2]

A-block-B-block-C-block-D         [Chemical Formula 3]

In Chemical Formulae 1 to 3, A, B, C, and D are the same or different and are independently one of polystyrene, polybutadiene, polybutylene, polyethylene, polyurethane, polyisoprene, or a derivative thereof.

Mechanical, electrical, and optical characteristics of the elastic polymer matrix depends on a chemical structure and inherent property of block copolymers consisting thereof. Specifically, when a rubber not cured with the block copolymer is used, much larger elasticity is obtained than a poly(dimethylsiloxane) (PDMS)-based cured polymer.

For example, a synthetic rubber such as polybutadiene (PB), poly(styrene-butadiene) (PS-b-PB, PS-co-PB), poly(styrene-butadiene-styrene) (PS-b-PB-b-PS) (SBS), poly(styrene-ethylene-butylene-styrene) (SEBS), an ethylene propylene diene rubber (EPDM), an acrylic rubber, a polychloroprene rubber (CR), polyurethane (PU), a fluorine rubber, a butyl rubber, and the like, or a natural rubber such as polyisoprene, and the like may be used as the block copolymer.

Conductive Film and Electrode Active Material Layer

The conductive film may be positioned on one surface or both surfaces of the composite film, the active material layer may be positioned on one surface of the conductive film, and this position relationship is related to a method of manufacturing the electrode.

More specifically described later, the conductive film (hereinafter, a first conductive film) is formed on one substrate by transferring a gold nanosheet (i.e., a first conductive material), and the composite film may be obtained by spin-coating an elastic polymer solution. On the composite film, another gold nanosheet (i.e., a second conductive material) may be transferred to form a conductive film including the second conductive material (hereinafter, a second conductive film).

Hereinafter, on the second conductive film, an electrode active material layer is formed, and a method of forming the electrode active material layer has no particular limit.

For example, the electrode active material layer may be directly formed on the second conductive film or transferred on the second conductive film after formed on a separate conductive film. These methods are respectively post-described in detail.

Regardless of the method of forming the electrode active material layer, an electrode may be obtained after forming the electrode active material layer. Herein, the obtained electrode is present on the substrate and thus may be applied to an electrochemical device after removing the substrate.

On the other hand, the electrode active material layer may include an electrode active material having a particle diameter of about 100 nm to about 200 nm. Herein, when the electrode is a negative electrode, a negative active material such as graphite, silicon (Si), germanium (Ge), $TiO_2$, $L_4Ti_5O_{12}$, and the like may be used, while when the electrode is a positive electrode, a positive active material such as $LiCoO_2$, $LiMnO_2$, $LiFePO_4$, and the like may be used.

Characteristics of Thickness, Composition, Etc.

A thickness of the composite film may be about 20 μm to about 40 μm.

The thickness of the conductive film may be about 1 μm to about 10 μm, specifically about 1 μm to about 5 μm. When the conductive film has a thickness within the range, conductivity may be maintained during elongation of the electrode. On the other hand, when the conductive film has a thickness of greater than or equal to about 5 μm, the conductive film may be detached from the composite film.

A thickness of the active material layer may be about 1 μm to about 5 μm.

On the other hand, the first conductive material may be included in an amount of about 10 wt % to about 20 wt %, the second conductive material may be included in an amount of about 30 wt % to about 40 wt %, the electrode active material layer may be included in an amount of about 10 wt % to about 15 wt %, the polymer matrix may be included in a balance based on a total amount, 100 wt % of the electrode. When the first conductive material is used within the range, the electrode may have excellent flexibility, safety, and electrochemical characteristics.

Method for Manufacturing Electrode for Electrochemical Device

According to another embodiment of the present invention, a method for manufacturing an electrode for an electrochemical device includes transferring a first conductive material on a substrate to form a first conductive film; spin-coating an elastic polymer solution on the first conductive film to disperse the elastic polymer solution inside and outside the first conductive film; drying the dispersed elastic polymer solution to form an elastic polymer matrix and to obtain a composite film including a first conductive material embedded inside the elastic polymer matrix; transferring a second conductive material on the composite film to form a second conductive film; transferring a third conductive material on another substrate to form a third conductive film; growing an active material on the third conductive film to form an active material layer; and transferring the third conductive film on which the active material layer is formed, on the second conductive film.

Herein, the first conductive material, the second conductive material, and the third conductive material are gold nanosheets, which are for convenience divided as described above.

On the other hand, in the manufacturing method, the gold nanosheet may be transferred by a general method where a solution including the gold nanosheet dispersed in a solvent is prepared and the solution is dropped on a water surface to form a thin film, and the formed thin film is transferred on the substrate.

The solvent capable of dispersing the gold nanosheet may be water, methanol, ethanol, propanol, isopropyl alcohol, butanol, ethylene glycol, dimethyl formamide (DMF), tetrahydrofuran (THF), or a mixed solvent of the two or more.

Hereinafter, a series of process including the each step is described in detail.

Forming Composite Film on Substrate

The substrate for forming the first conductive film and the composite film may be selected from substrates consisting of PDMS (polydimethylsiloxane), a silicon wafer, or silicon.

On this substrate, gold nanosheets (i.e., a first conductive material) may be greater than or equal to about twice and specifically, about 7 to about 8 times transferred to form a film having a thickness ranging from about 500 nm to about 1 μm. This film may be called to be a first conductive film, in which the gold nanosheets are three dimensionally aggregated.

Subsequently, on the first conductive film, an elastic polymer solution may be spin-coated and dispersed inside and outside the first conductive film. The dispersed elastic polymer solution may be dried to form an elastic polymer matrix to obtain a composite film that the first conductive material is embedded inside the elastic polymer matrix.

Accordingly, the composite film may have a thickness adjusted by concentration of a polymer material and a condition for spin-coating this (e.g., speed, time, and the like).

The elastic polymer solution may be prepared by dissolving the aforementioned block copolymer in a solvent to have appropriate viscosity. The solvent may be chloroform, chlorobenzene, toluene, dimethylformaldehyde, tetrahydrofuran, dimethyl sulfoxide, N-methylpyrrolidone, or fluorinate.

The elastic polymer solution may have viscosity ranging from about 10 to about 15 poise, and this concentration may be obtained by using about 10 wt % to about 15 wt % of the block copolymer based on the total amount (100 wt %) of the elastic polymer solution.

When the elastic polymer solution satisfies the viscosity and concentration ranges, the elastic polymer solution may be uniformly dispersed inside and outside the first conductive film. Specifically, since the first conductive film is a gold nanosheet aggregate, the elastic polymer solution may be partly impregnated and dispersed in an empty space of the aggregate (i.e., a first conductive film) and partly dispersed outside of the aggregate.

However, when the viscosity and concentration are smaller than the ranges, the polymer matrix may become thinner and have a limit in terms of flexibility. On the contrary, the viscosity and concentration are larger than the ranges, the elastic polymer solution may be impregnated in a limited amount inside the first conductive film, but a thick polymer matrix may be formed outside thereof, and thus relatively conductivity may be decreased.

On the other hand, a polymer solution satisfying the viscosity and concentration ranges may be spin-coated at a speed of about 1000 rpm to about 2000 rpm for about 30 seconds to about 60 seconds. Accordingly, the elastic polymer solution dispersed inside and outside the first conductive film may be dried to obtain an about 20 μm- to about 40 μm-thick composite film. This is an entire thickness range of the composite film including the elastic polymer matrix and the gold nanosheets embedded thereinside.

The drying may be performed within a temperature range of about 70° C. to about 80° C. for about 1 minute to about 5 minutes. This is a condition under which a solvent in the dispersed elastic polymer solution may be removed.

Forming Second Conductive Film on Composite Film

As described above, the second conductive material may be greater than or equal to about twice transferred on one surface or both surfaces of the composite film to form a second conductive film.

Specifically, the second conductive material may be greater than or equal to about twice transferred on the composite film formed in the previous process to form a gold nanosheet aggregate (i.e., a second conductive film) on only one surface of the composite film.

On the other hand, another second conductive film may be formed on the other surface of the composite film by removing the substrate from the composite film having the second conductive film on one surface and bonding the substrate with the second conductive film to expose the other surface of the composite film. On the exposed composite film, the second conductive material may be greater than or equal to about twice transferred to form a gold nanosheet aggregate on both surfaces of the composite film (i.e., a second conductive film).

Forming Electrode Active Material Layer on Second Conductive Film

A method of forming an electrode active material layer on the second conductive film has no particular limit as aforementioned.

For example, the electrode active material layer may be directly formed on the second conductive film in a method of spin coating, spraying, electro-spinning, a hydrothermal synthesis method, a polyol synthesis method, a solid-phase method, and the like. The spin coating is used in post-described Examples as a method generally known in a battery field.

Otherwise, an electrode active material layer is formed on a separate conductive film and transferred on the second conductive film. Herein, gold nanosheets (i.e., a third conductive material) are transferred on another substrate to form a conductive film (hereinafter, a third conductive film), and an electrode active material grows thereon to obtain a third conductive film having an electrode active material layer. The third conductive film having the electrode active material layer is transferred on the second conductive film to obtain the electrode.

Herein, when the electrode is a negative electrode, a negative active material such as graphite, silicon (Si), germanium (Ge), $TiO_2$, $L_4Ti_5O_{12}$, and the like may be used, while when the electrode is a positive electrode, a positive active material such as $LiCoO_2$, $LiMnO_2$, $LiFePO_4$, and the like may be used.

Subsequently, the electrode active material may be further crystallized through a heat-treatment at about 400° C. to about 600° C.

As aforementioned, regardless of a method of forming the electrode active material layer, an electrode may be obtained after forming the electrode active material layer. Herein, the obtained electrode is present on the former substrate and thus may be applied to an electrochemical device by removing the substrate.

Electrochemical Device

In another embodiment of the present invention, an electrochemical device includes a positive electrode; negative electrode; and a gel polymer electrolyte between the positive electrode and the negative electrode, wherein at least one electrode of the positive electrode and the negative electrode is the electrode.

The above electrode as either one of the positive electrode and the negative electrode and a gel polymer electrolyte as an electrolyte may be applied to realize a thinness, exhibit excellent flexibility, safety, and excellent cycle-life characteristics.

Specifically, the electrochemical device may be a rechargeable lithium battery, a sodium rechargeable battery, or a super capacitor. For example, when the electrochemical device is the rechargeable lithium battery, initial efficiency of greater than or equal to about 80% may be obtained.

Accordingly, the electrochemical device as a so called "elongatable energy storage system" may be applied to a wearable apparatus, a flexible apparatus, and the like.

The electrolyte separates the positive and negative electrodes and provides a passage for metal ions and may maintain a shape during an elongation and a shrinkage. In other words, the gel electrolyte may have low resistance against an ion movement and secure an elongation property.

For example, the gel electrolyte may include a lithium salt and may be in a gel state. The lithium salt dissolved in the gel electrolyte acts a source of a lithium ion in a battery, enables basic operation of a lithium electrochemical device, and improves lithium ion transportation between positive and negative electrodes therein. Examples of the lithium salt may be $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers), LiCl, LiI, $LiB(C_2O_4)_2$ (lithium bis(oxalato) borate; LiBOB) or a combination thereof, as a supporting electrolytic salt. A concentration of the lithium salt may be about 0.1 M to about 2.0 M. When the lithium salt is included at the above concentration range, an electrolyte may have excellent performance and lithium ion mobility due to optimal electrolyte conductivity and viscosity.

A packaging material of the electrochemical device may be PDMS (polydimethlysiloxane).

In addition, constituent elements of the electrochemical device are the same as generally known and will not be described in detail.

According to an embodiment of the present invention, an electrode for an electrochemical device may have flexibility, safety, conductivity, and the like.

In addition, according to another embodiment of the present invention, the electrode for an electrochemical device may be manufactured.

Furthermore, yet another embodiment of the present invention may provide an electrochemical device having excellent flexibility, safety, and excellent cycle-life characteristics by using the electrode for an electrochemical device for at least one of positive and negative electrodes.

DETAILED DESCRIPTION OF THE EMBODIMENTS

Hereinafter, Examples of the present invention, Comparative Examples, and Evaluation Examples are described. These examples, however, are not in any sense to be interpreted as limiting the scope of the invention.

EXAMPLE 1

(1) Manufacture of Negative Electrode

Figure 1:
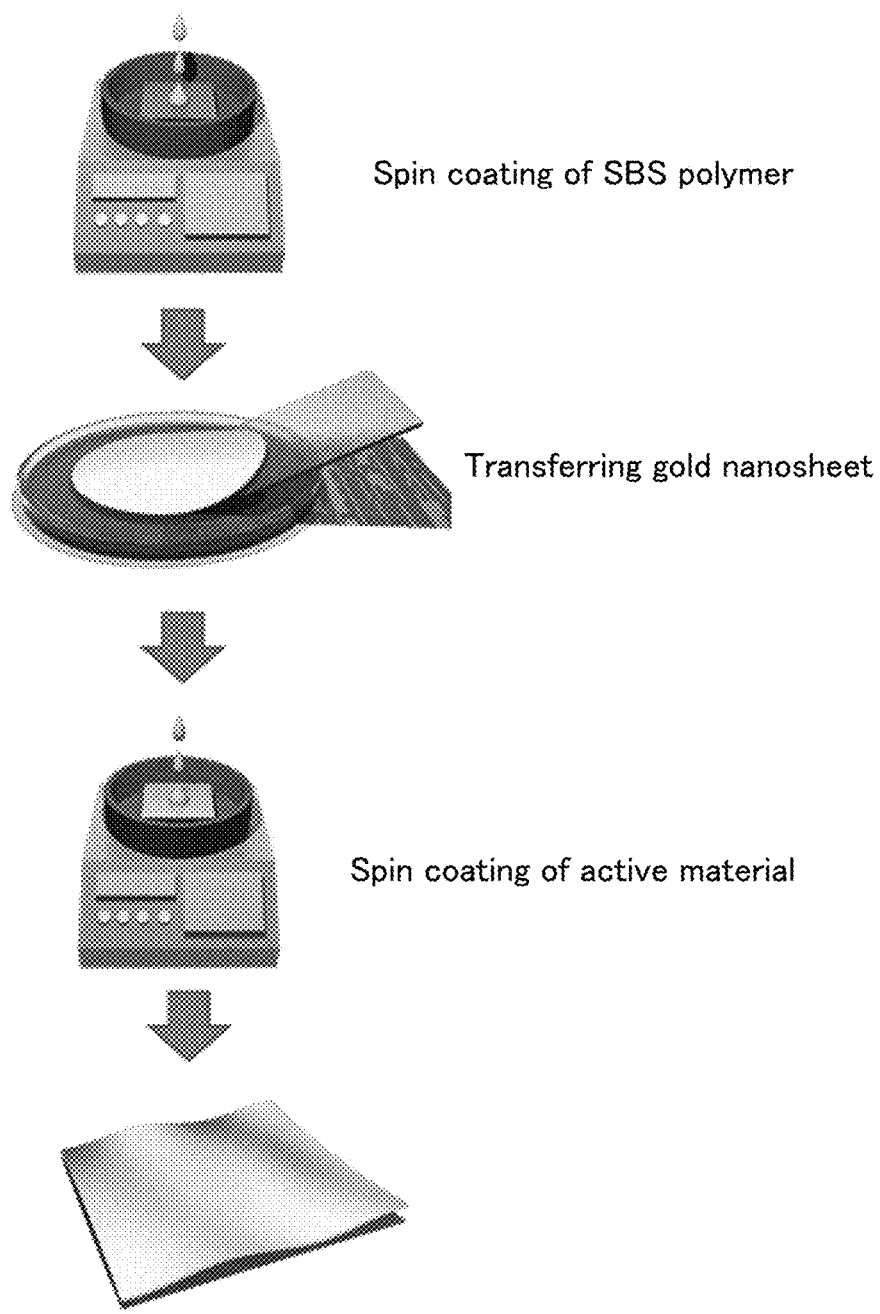
FIG. 1 schematically shows a process of manufacturing an electrode according to an example embodiment of the present invention.

An electrode was manufactured according to a process schematically shown in FIG. 1.

1) Forming Composite Film on Substrate

A thin film was formed by dispersing a gold nanosheet (width: 10 μm, length: 15 μm, thickness: 5 nm) in butanol to prepare a solution (a concentration: 5 wt %)) and dropping the solution on the surface water and then, transferred into a PDMS (polydimethylsiloxane) substrate. The process was 7 to 8 times repeated on the substrate to form a 2 cm-wide, 2 cm-long, and 1 μm-thick first conductive film.

On the first conductive film, a SBS block copolymer solution (a concentration: 10 wt %, viscosity: 10 poise) was spin-coated. Herein, the spin coating was performed under a condition (a rotation speed: 2000 rpm, time: 60 seconds).

Accordingly, a 2 cm-wide, 2 cm-long, and 40 μm-thick composite film was formed on the substrate. The composite film has a structure that a gold nanosheet was embedded in an elastic polymer matrix consisting of a SBS block copolymer, wherein the gold nanosheet/the elastic polymer matrix had a weight ratio of 10/100 and with a total thickness of 40 μm.

2) Forming Second Conductive Film on Composite Film

A second conductive film was formed by transferring a gold nanosheet on the composite film according to the same method as above.

However, the second conductive film was formed on both surfaces of the composite film by seven times transferring the second conductive material only on one surface of the composite film to form a gold nanosheet aggregate (i.e., a second conductive film) and forming another second conductive film on the other surface of the composite film.

Then, the substrate was removed and then, bonded with the second conductive film, so that the other surface of the composite film might be exposed outside. On the exposed composite film, the second conductive material was seven times transferred to form each 1 μm-thick second conductive film on both surfaces of the composite film. In other words, a structure of the second conductive film/the composite film/the second conductive composite film was obtained.

3) Forming Negative Active Material Layer on Second Conductive Film

A negative active material was spin-coated on the second conductive film.

Specifically, as for the negative active material, $L_4Ti_5O_{12}$ (an average particle diameter: 200 nm) was used to prepare electrode active material slurry, and the electrode active material slurry was used to form an electrode active material layer on the second conductive film.

More specifically, the negative active material slurry was prepared by mixing the negative active material: carbon black (an average particle diameter:20 nm): CMC (carboxylmethyl cellulose) in a weight ratio of 8:1:1 and adjusting its slurry phase with a solvent (deionized water).

The negative active material slurry was spin-coated on the second conductive film at a rotation speed of 2000 rpm for 60 seconds and then, heat-treated and dried at 100° C.

Accordingly, the second conductive film having the negative active material layer (a loading amount: 0.0018 g/cm$^2$) was obtained. In other words, a negative electrode having a structure of the conductive film/the composite film/the conductive film/the negative active material was obtained.

(2) Manufacture of Positive Electrode

A positive electrode was manufactured according to the same process as the above process of manufacturing the negative electrode except for using LiFePO$_4$ (an average particle diameter: 150 nm) as a positive active material instead of the negative active material.

Accordingly, the positive electrode having a structure of the conductive film/the composite film/the conductive film/the positive active material was obtained.

(3) Manufacture of Rechargeable Lithium Battery (Half-cell)

A rechargeable lithium battery coin half-cell was manufactured by using the negative electrode manufactured in (1) of Example 1 and a Li-metal as a counter electrode.

On the other hand, a rechargeable lithium battery pouch half-cell was also manufactured by using the negative electrode manufactured in (5) of Example 1 and a Li-metal as a counter electrode.

Each battery used a gel electrolyte prepared by using sebaconitrile as a solvent and LiTFSi (lithium bis-trifluoromethanesulphonimide) as a lithium salt. When the lithium salt was used in a concentration ranging from 0.1 to 2.0 M, the electrolyte had appropriate conductivity and viscosity during an elongation process and showed excellent electrolyte performance.

As for the rechargeable lithium battery pouch half-cell, PDMS (poly dimethlysiloxane) was used as a packing material in a commonly known method.

Comparative Example 1

(1) Manufacture of Electrode

An SBS block copolymer solution was spin-coated on a substrate without forming the first conductive film unlike. Accordingly, only a 2 cm-wide, 2 cm-long, and 40 μm-thick elastic polymer matrix was formed on the substrate.

(2) Manufacture of Rechargeable Lithium Battery Cell

A rechargeable lithium battery coin half-cell was manufactured according to the same method as Example 1 by using the electrode according to Comparative Example 1.

Evaluation Example 1: Examination with Scanning Electron Microscope (SEM)

Figure 2:
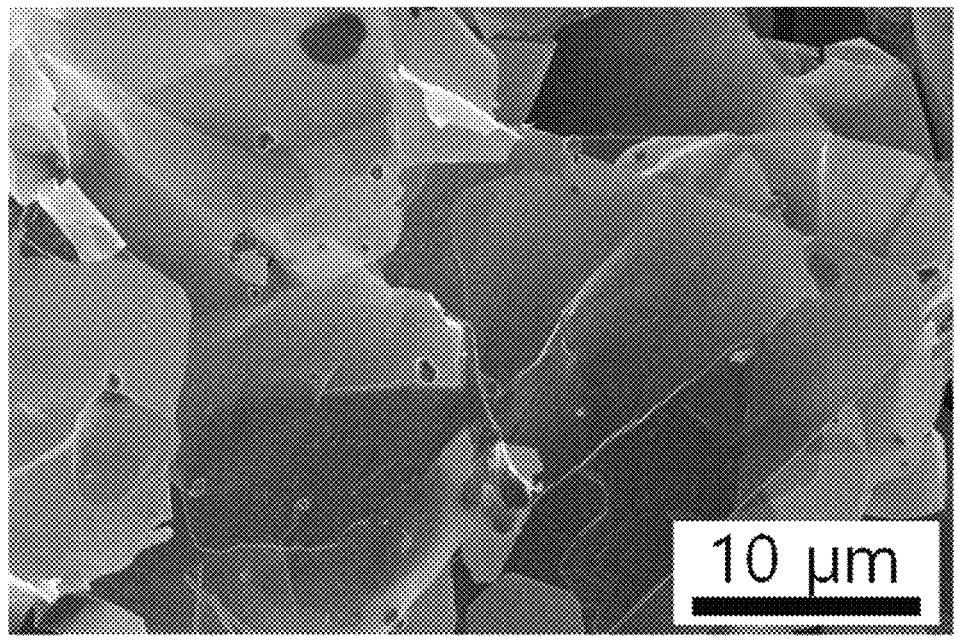
FIGS. 2 and 3 are scanning electron microscope (SEM) photographs respectively showing a first conductive film (FIG. 2) and a composite film (FIG. 3) according to the example embodiment of the present invention.

1) FIG. 2 is a SEM photograph showing the first conductive film according to Example 1.

Referring to FIG. 2, 10 μm-wide, 15 μm-long, and 2 nm-thick gold nanosheets were three dimensionally aggregated to form a film.

Figure 3:
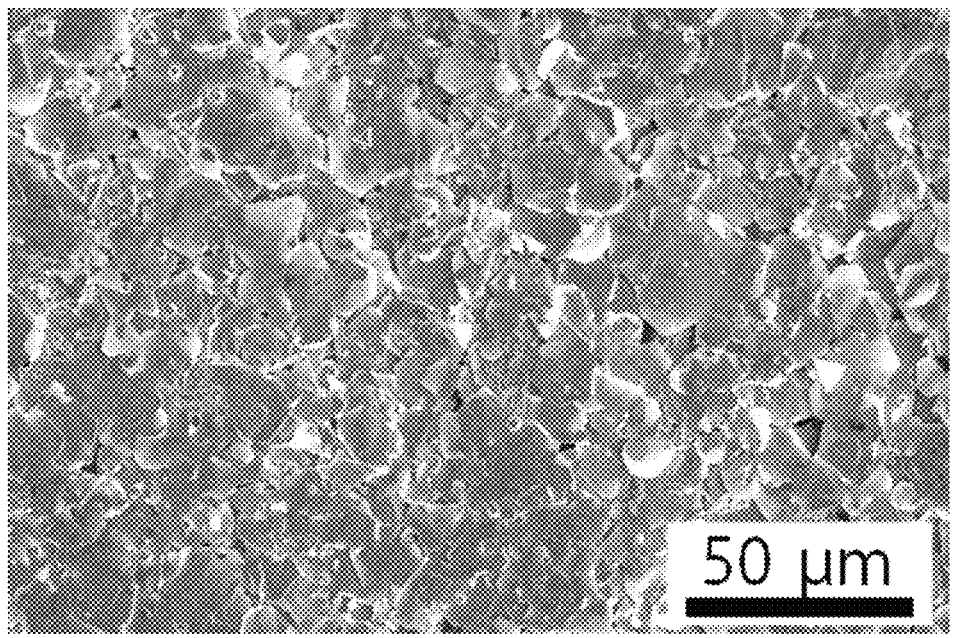
Figure 4:
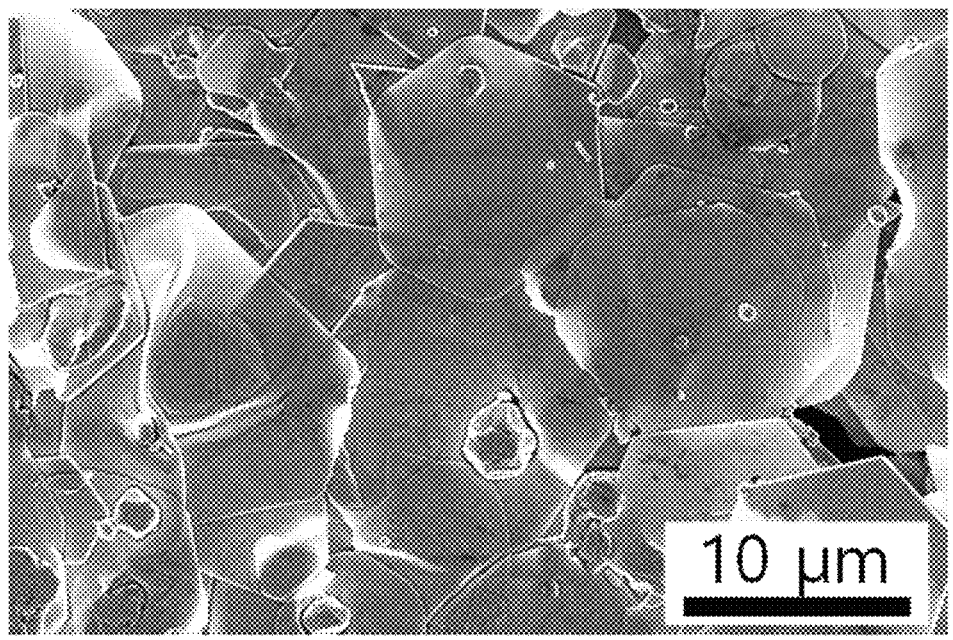
FIG. 4 is a photograph enlarging FIG. 3.
Figure 5:
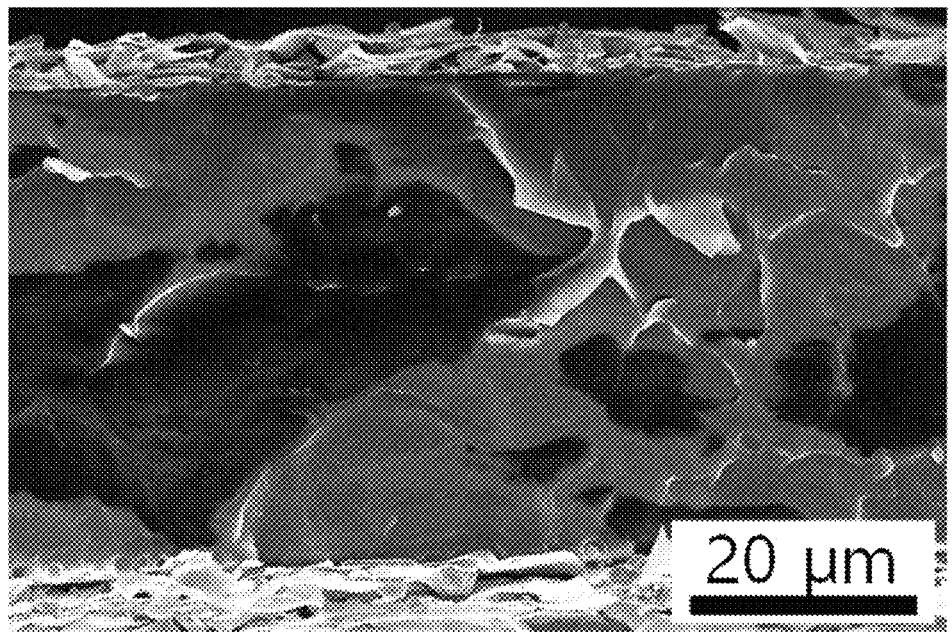
FIG. 5 is a photograph showing a cross section of FIG. 4.

2) FIG. 3 is a SEM photograph showing the composite film of Example 1, FIG. 4 is a photograph enlarging the SEM photograph of FIG. 3, and FIG. 5 is a photograph showing the cross section of FIG. 4.

Referring to FIGS. 3 to 5, a structure that the gold nanosheets were uniformly embedded inside the elastic polymer matrix with high density was found through spin coating.

Figure 6:
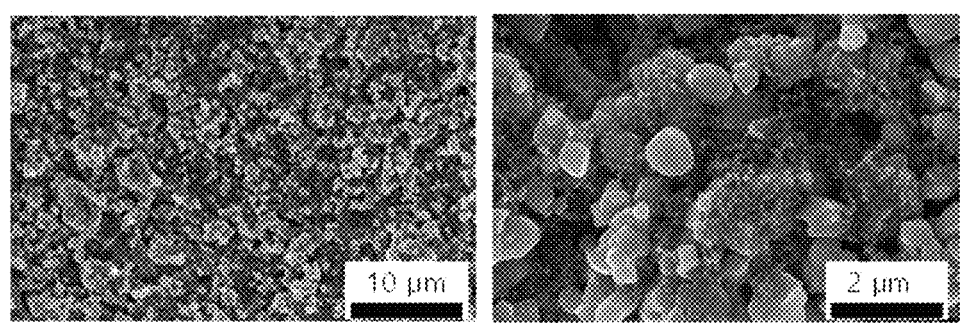
FIG. 6 is a SEM photograph showing an electrode active material layer on a third conductive film according to Example 1 of the present invention.

3) FIG. 6 is a SEM photograph showing the conductive film coated with the negative active material layer according to Example 1.

Referring to FIG. 6, the negative active material layer had a total thickness of 5 μm by uniformly coating a negative active material having an average particle diameter of 100 nm and a conductive material having an average particle diameter of 10 nm.

Evaluation Example 2: Electrical Conductivity and Tensile Strength of Electrode in Elongation State Electrical conductivity and tensile strength were measured by respectively elongating the negative electrodes according to Example 1 and Comparative Example 1. The results are shown in graphs of FIGS. 7 and 8.

Figure 7:
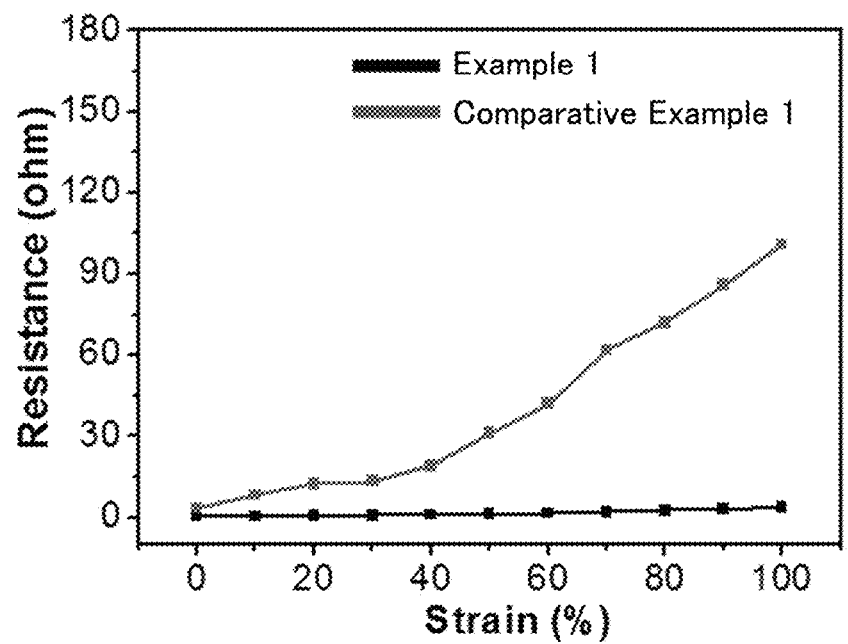
FIG. 7 shows electrical conductivity results of electrodes according to Example of the present invention and Comparative Example while elongated.

Referring to FIG. 7, the negative electrode of Example 1 showed almost no resistance increase when twice elongated (i.e., an x axis is 100%) relative to that of the negative electrode before the elongation (i.e., the x axis is 0). The electrode of Comparative Example 1 showed greater than or equal to 100 times increased resistance when twice elongated compared with that of the electrode before the elongation (i.e., an x axis is 0).

Figure 8:
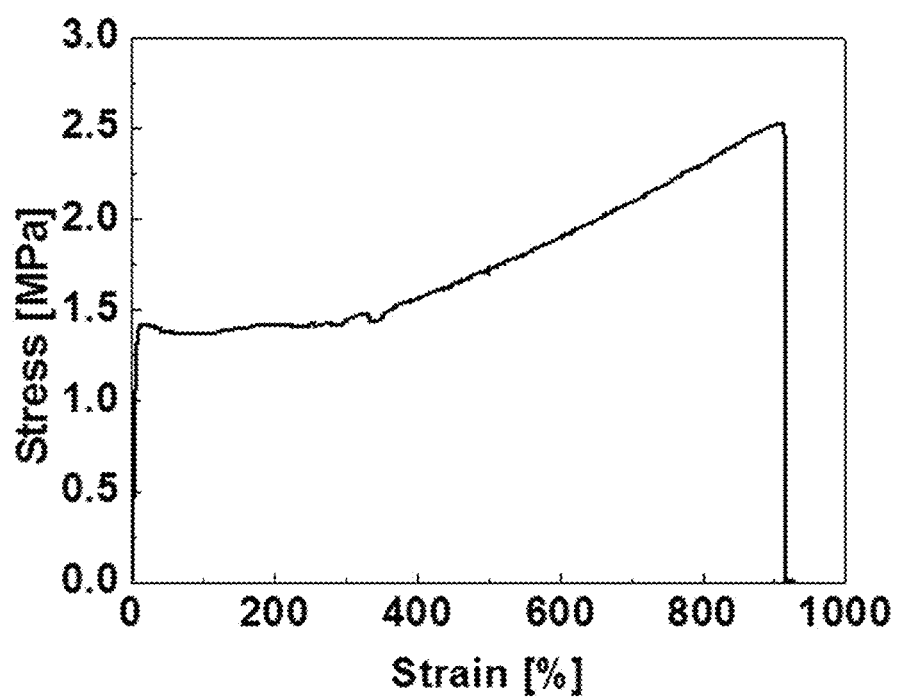
FIG. 8 shows tensile strength results of the electrode according to Example of the present invention.

Referring to FIG. 8, the negative electrode of Example 1 was finally broken when greater than or equal to 900% elongated.

Evaluation Example 3: Initial Voltage Profile

Figure 9:
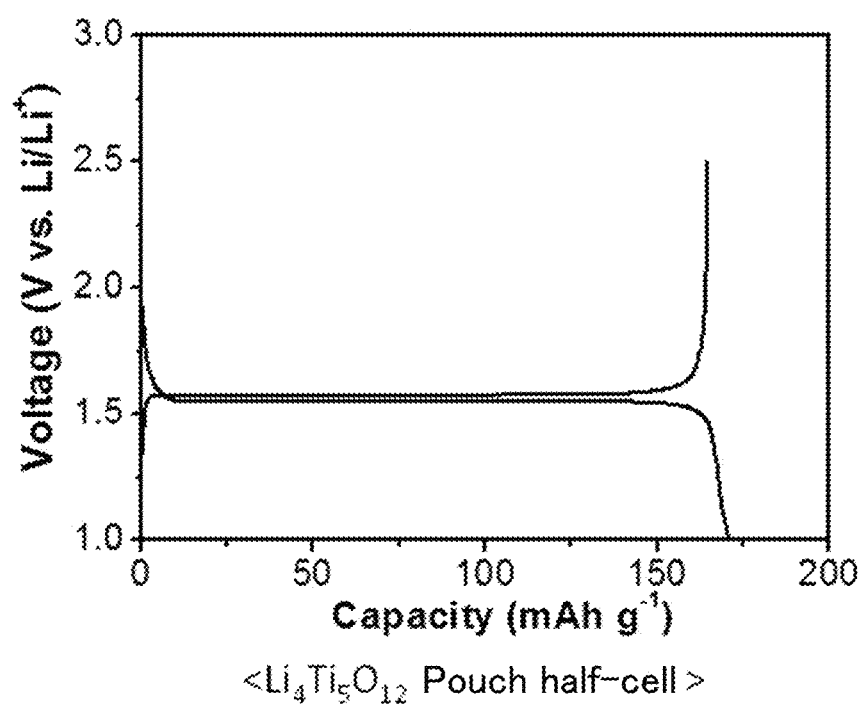
FIG. 9 shows a negative electrode voltage profile of a rechargeable lithium battery cell according to Example of the present invention.
Figure 10:
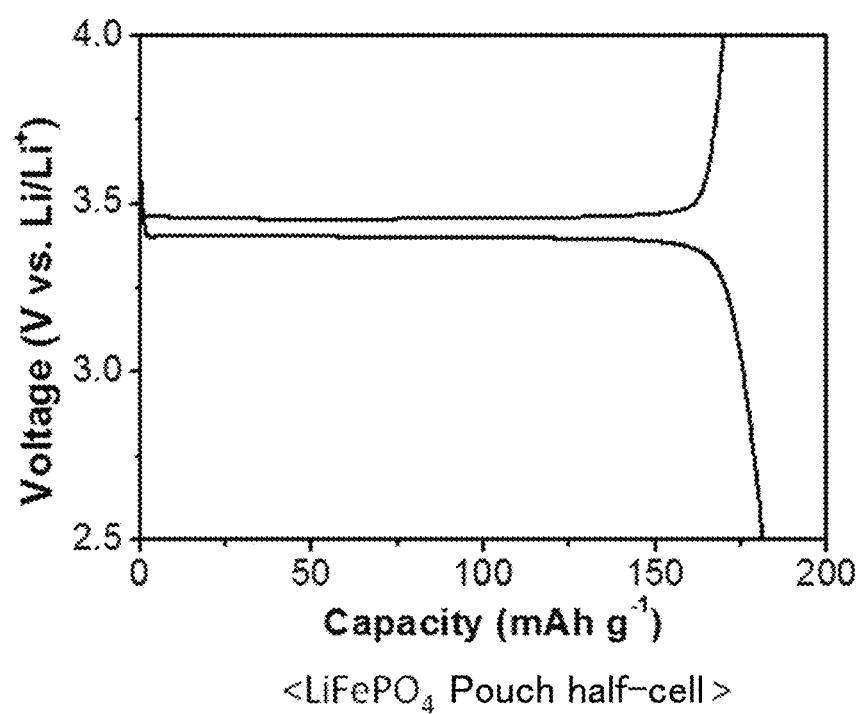
FIG. 10 shows a positive electrode voltage profile of the rechargeable lithium battery cell according to Example of the present invention.

An initial voltage profile of positive and negative electrodes about the rechargeable lithium battery cell of Example 1 was evaluated, and the results are shown in FIG. 9 (negative electrode) and FIG. 10 (positive electrode). The voltage profile was evaluated at a 0.1C rate within a voltage range of 1 V to 3.0 V as for the negative electrode but within a voltage range of 2.5 V to 4 V as for the positive electrode. In FIG. 9, since a descending curved line indicates discharge capacity, while an ascending curved line indicates charge capacity, electrochemical characteristics may be evaluated referring to FIG. 9.

In FIG. 9, when the negative electrode of (1) of Example 1 was used, initial discharge capacity was 170 mAh/g, charge capacity was 165 mAh/g, and initial coulomb efficiency was 97%. In addition, in FIG. 10, when the positive electrode of (1) of Example 1 was used, initial discharge capacity was 181 mAh/g, and charge capacity was 172 mAh/g.

Accordingly, each electrode of Example 1 secured electrochemical safety at a potential where lithium ion battery cells were operated.

Evaluation Example 4: Cycle Characteristics

Figure 11:
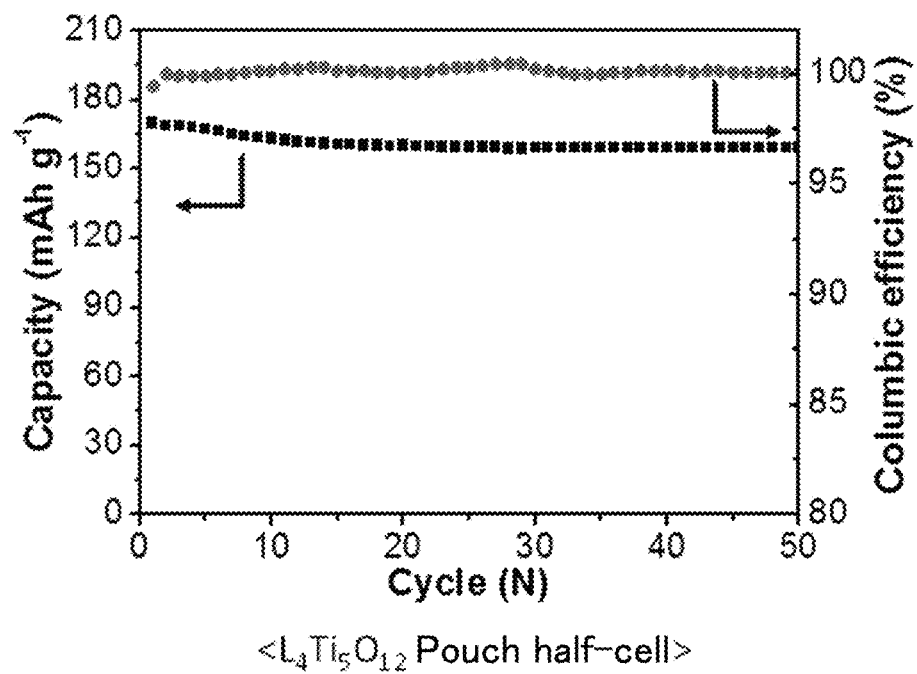
FIG. 11 shows negative electrode cycle characteristics of the rechargeable lithium battery cell according to Comparative Example.
Figure 12:
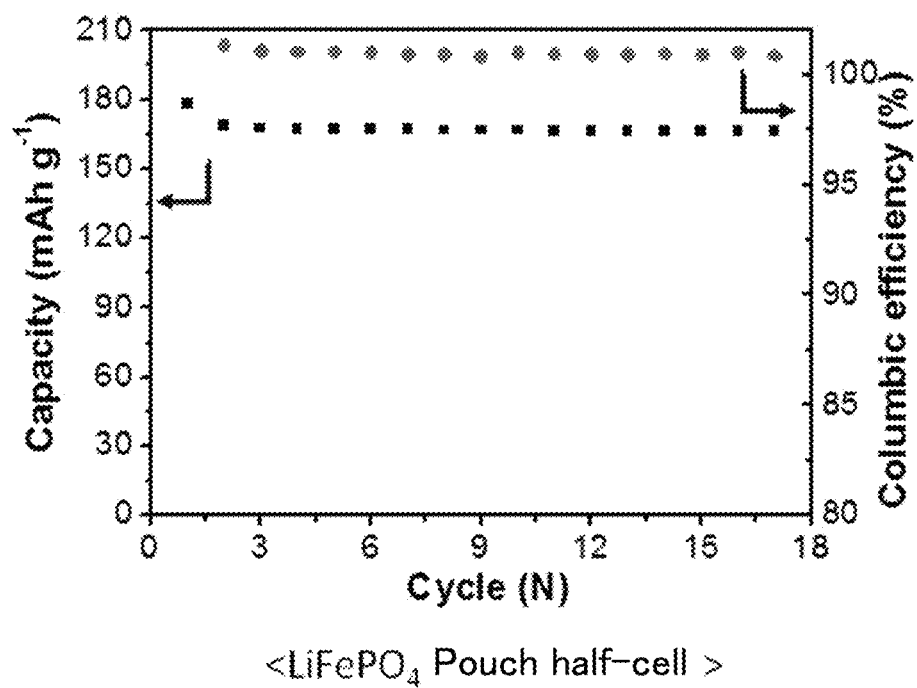
FIG. 12 shows cycle characteristics of a positive electrode of the rechargeable lithium battery cell according to Comparative Example.

Cycle characteristics of the rechargeable lithium battery cells of Example 1 were evaluated, and the results are shown in FIGS. 11 and 12. In FIGS. 11 and 12, a lower graph indicates charge capacity, and an upper graph indicates coulomb efficiency. The cycle characteristics were evaluated by performing charge/discharge at a 1 C rate within the same voltage range as Evaluation Example 3.

Referring to FIG. 11, when the negative electrode of Example 1 was used, the cell exhibited capacity of 155 mAh/g after 50 cycles and maintained greater than or equal to 99.5% of the capacity. In addition, referring to FIG. 12, when the positive electrode of (1) of Example 1 was used, the cell exhibited capacity of 165 mAh/g after 15 cycles.

Evaluation Example 5: Capacity Change Depending on Elongation

Figure 13:
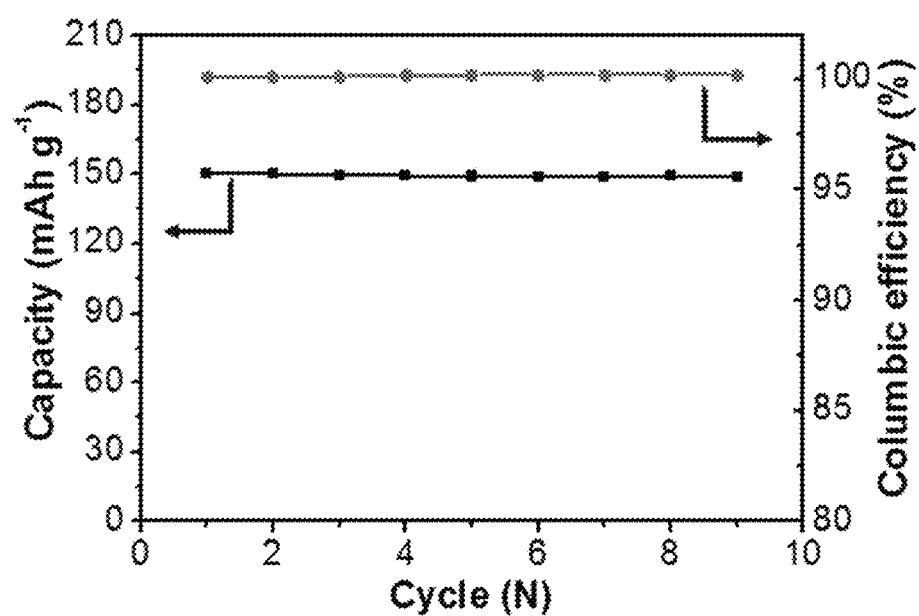
FIG. 13 shows cycle characteristics of the rechargeable lithium battery cell according to Example of the present invention after an elongation of 15%.
Figure 14:
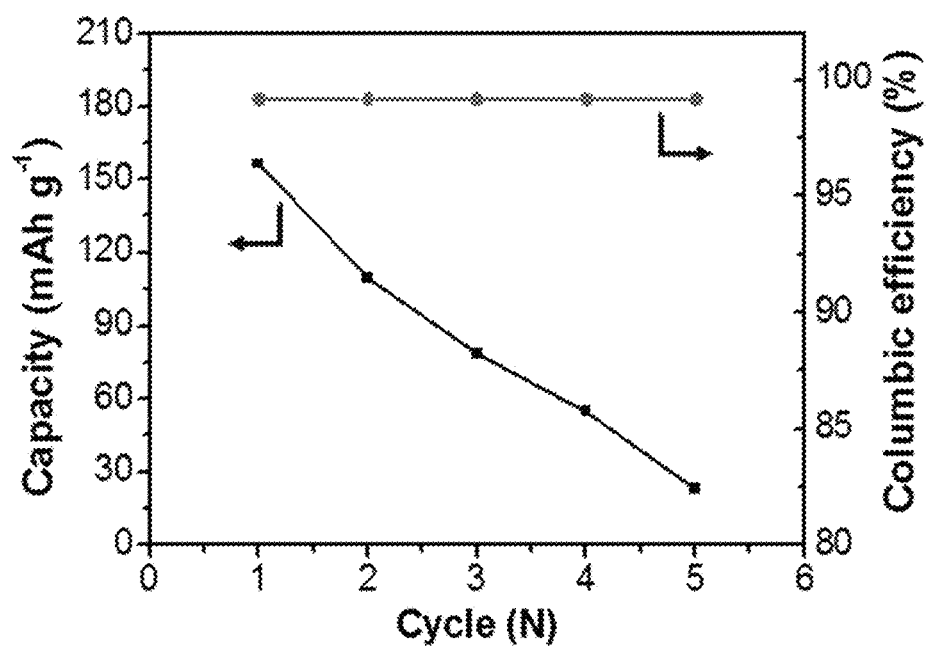
FIG. 14 shows cycle characteristics of the rechargeable lithium battery cell according to Comparative Example after an elongation of 15%.

A capacity change of rechargeable lithium battery cells respectively using the negative active materials of Example 1 and Comparative Example 1 depending on an elongation was evaluated, and the results are shown in FIGS. 13 and 14. Separately, a capacity change of the rechargeable lithium battery cell of Comparative Example 1 depending on an elongation was evaluated, and the results are shown in FIG. 13.

Referring to FIG. 13, the electrode showed stable cycle performance and greater than or equal to 99.5% of coulomb efficiency when 15% elongated. On the contrary, in FIG. 14, the electrode of Comparative Example 1 showed five times reduced capacity of 30 mAh/g after 5 cycles relative to the initial capacity.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A method for manufacturing an electrode for an electrochemical device, comprising
    transferring a first conductive material on a substrate to form a first conductive film, wherein the first conductive material comprises gold nanosheet aggregates and empty spaces among the gold nanosheet aggregates;
    spin-coating an elastic polymer solution on the first conductive film to disperse the elastic polymer solution inside the empty spaces and outside the first conductive film;
    drying the dispersed elastic polymer solution to form an elastic polymer matrix and to obtain a composite film including the first conductive material embedded inside the elastic polymer matrix;
    transferring a second conductive material on the composite film to form a second conductive film; and
    forming an active material layer on the second conductive film,
    wherein the second conductive material is a gold nanosheet.

2. The method of claim 1, wherein the spin-coating of an elastic polymer solution on the first conductive film to disperse the elastic polymer solution inside and outside the first conductive film is performed at a rotation speed of about 1000 rpm to about 2000 rpm.

3. The method of claim 1, wherein the drying of the dispersed elastic polymer solution to form an elastic polymer matrix and to obtain a composite film including a first conductive material embedded inside the elastic polymer matrix is performed at a temperature range of about 70° C. to about 80° C.

4. The method of claim 1, wherein the transferring of the second conductive material on the composite film to form a second conductive film is transferring the second conductive material on one surface or both surfaces of the composite film twice or more.

5. The method of claim 1, wherein the forming of the active material layer on the second conductive film is performed by spin coating, transferring, spraying, electrospinning, a hydrothermal synthesis method, a polyol synthesis method, or a solid-phase method.

6. The method of claim 1, wherein the transferring of the first conductive material on a substrate to form a first conductive film is transferring the first conductive material on one surface of the substrate twice or more.

* * * * *